United States Patent
Iwasaki

[11] Patent Number: 6,104,549
[45] Date of Patent: Aug. 15, 2000

[54] ZOOM LENS DEVICE WITH ZOOMING POSITION DETECTOR

[75] Inventor: Hiroyuki Iwasaki, Saitama, Japan

[73] Assignee: Fuji Photo Film Co., Ltd., Kanagawa, Japan

[21] Appl. No.: 09/299,637

[22] Filed: Apr. 27, 1999

Related U.S. Application Data

[62] Division of application No. 09/118,084, Jul. 17, 1998, Pat. No. 5,926,322.

[30] Foreign Application Priority Data

| Aug. 4, 1997 | [JP] | Japan | 9-209230 |
| Aug. 4, 1997 | [JP] | Japan | 9-209382 |
| Sep. 5, 1997 | [JP] | Japan | 9-240558 |

[51] Int. Cl.[7] .................................................. G02B 15/14
[52] U.S. Cl. ............................................................ 359/694
[58] Field of Search ........................... 359/694, 704, 359/700, 701, 823

[56] References Cited

U.S. PATENT DOCUMENTS

| 4,912,488 | 3/1990 | Berglund et al. | 346/108 |
| 5,602,681 | 2/1997 | Nakayama et al. | 359/698 |
| 5,854,711 | 12/1998 | Kaneda | 359/697 |
| 5,940,226 | 8/1999 | Tanaka | 359/819 |

FOREIGN PATENT DOCUMENTS

| 50-36118 | 4/1975 | Japan . |
| 5-31634 | 8/1993 | Japan . |
| 2-521469 | 12/1996 | Japan . |

Primary Examiner—Ricky Mack
Attorney, Agent, or Firm—Young & Thompson

[57] ABSTRACT

A zoom lens device has a zooming position detector consisting of a code plate and a brush device. The code plate is mounted to a front face of a shutter unit that is attached to a front end of an axial movement barrel. The axial movement barrel is located inside a helical movement barrel so as to be immovable in the axial direction relative to the helical movement barrel, but is rotated relative to the helical movement barrel for zooming. The brush device is mounted to an inner peripheral portion of a lens barrel that is located near the face of the shutter unit and rotates relative to the face of the shutter unit, such that the electric contact strips brush the code plate while the shutter unit rotates relative to the lens barrel for zooming. A zooming position of the zoom lens device is determined based on output signals from the brush device.

2 Claims, 13 Drawing Sheets

ZOOM LENS DEVICE WITH ZOOMING POSITION DETECTOR

CROSS-REFERENCE TO RELATED APPLICATIONS

This application is a division of copending application Ser. No. 09/118,084, now U.S. Pat. No. 5,926,322, filed Jul. 17, 1998.

BACKGROUND OF THE INVENTION

1. Field of the Invention

The present invention relates to a zoom lens device whose lens barrel elements rotate relative to each other for changing the focal length, i.e. for zooming. The present invention relates more particularly to a zoom lens device having a zooming position detector mounted in a compact fashion.

2. Background Arts

A zoom lens device has at least front and rear lens groups whose positions are changed relative to a film surface and relative to each other in the direction of the optical axis of the zoom lens device. Since there is a clearance between barrels that hold the front and rear lens groups respectively, extraneous light would enter inside the zoom lens device through the clearance without any light-shielding device. JPY 5-31634 discloses a light-shielding device for a zoom lens device, which is constituted of a light-shielding ring having a resilient lip around its inner rim. The light-shielding ring is placed behind a face flange surrounding an opening of a front wall of a camera body such that the resilient lip stays in contact with the outer periphery of a lens barrel or lens cover frame that moves with the front lens group in the axial direction through the opening of the front wall.

The light-shielding ring disclosed in JPY 5-31634 is useful for a clearance around a lens barrel that moves in the axial direction relative to a fixed barrel. However, the light-shielding ring is not preferable for a lens device where a front lens frame is rotatably held in a barrel, and a front cover member having an opening for exposing the front lens is attached to a front end of the barrel, and a clearance is provided between the front lens frame and the front cover member for allowing the front lens frame to rotate relative to the front cover member. If the light-shielding ring is used for the clearance between the front cover member and the front lens frame, the outer periphery of the front lens frame would rub against the lip of the light-shielding ring as the front lens frame rotates relative to the front cover member. The friction between the front lens frame and the front cover member would raise the necessary driving force for the lens device. The lip of the light-shielding ring would sooner be worn out or heat-deformed by the frequent friction. Besides, the light-shielding ring increases the requisite number of parts necessary for the lens device.

On the other hand, it is known in the art to provide a zooming position detector in a zoom lens device. For example, JPA 50-36118 discloses a zooming position detector consisting of an encoder plate and a brush device. The encoder plate is coupled to a lens barrel of a zoom lens device through gears and a lead screw, such that the encoder plate moves in the axial direction of the zoom lens device as the lens barrel rotates for zooming. As the encoder plate moves in the axial direction, the brush device brushes conductor patterns on the encoder plate detecting signals corresponding to the rotational angle of the lens barrel. Japanese Utility Model Registration No. 2521469 discloses a zooming position detector wherein a code plate having conductor patterns are tightly provided on an outer periphery of a cam ring that rotates for zooming, whereas a brush device brushing the conductor patterns is secured to a stationary frame outside the cam ring.

Either of the prior zooming position detectors needs a mounting space outside the movable lens barrel, which inevitably enlarges the whole size of the camera.

SUMMARY OF THE INVENTION

In view of the foregoing, an object of the present invention is to provide a zoom lens device having a zooming position detector which does not need a specific space outside the zoom lens device.

Another object of the present invention is to provide a light-shielding device for preventing extraneous light entering inside a lens device through a clearance between a front cover member of the lens device and a member that is placed behind the front cover member and rotates relative to the front cover member.

To achieve the first object, a zoom lens device according to the present invention is comprised of a cylindrical lens barrel; a member that is mounted inside the lens barrel, the member being immovable in the direction of an optical axis of the zoom lens device relative to the lens barrel, but rotating about the optical axis relative to the lens barrel during zooming; a code plate mounted to one of a face of the member and an inner portion of the lens barrel that is located near the face of the member and rotates relative to the face of the member; a brush device having electric contact strips, the brush device being mounted to the other of the face of the member and the inner portion of the lens barrel, such that the electric contact strips brush the code plate while the member rotates relative to the lens barrel for zooming; and a determination device for determining a zooming position of the zoom lens device based on a rotational position of the lens barrel relative to the member that is shown by output signals from the electric contact strips.

According to a preferred embodiment, the member is a shutter unit into which a shutter mechanism and an actuator for the shutter mechanism are incorporated, and the lens barrel is a helical movement barrel that moves in the direction of the optical axis while rotating inside a barrel fixed to a camera body, whereas the shutter unit is secured to a front of an axial movement barrel that moves in the direction of the optical axis together with the helical movement barrel without rotating relative to the fixed barrel.

As the code plate and the brush device are located inside the lens barrel, they do not need any specific room outside the lens barrel of the zoom lens device.

To achieve the second object, a lens device according to the present invention is comprised of a lens barrel, an internal member that is mounted inside the lens barrel and rotatable about an optical axis of the zoom lens device relative to the lens barrel but immovable in a direction of the optical axis relative to the lens barrel, and a front cover member secured to a front end of the lens barrel, the front cover member having an opening for exposing a center portion of the internal member, wherein a front face of the internal member and a rear surface of the front cover member are engaged with each other through a labyrinth engagement, and a clearance is provided in between the internal member and the front cover member for allowing the internal member to rotate relative to the front cover member.

According to a preferred embodiment, the internal member is a front lens frame, and a circular groove is formed in one of the front face of the front lens frame and the rear surface of the front cover member; and a circular ridge is formed in the other of the front face of the front lens frame and the rear surface of the front cover member, the circular ridge being fitted in the circular groove with the clearance.

Because of the labyrinthine engagement or the meanders of the clearance, extraneous light entering through the clearance is attenuated so much that it does not reach inside the lens device.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
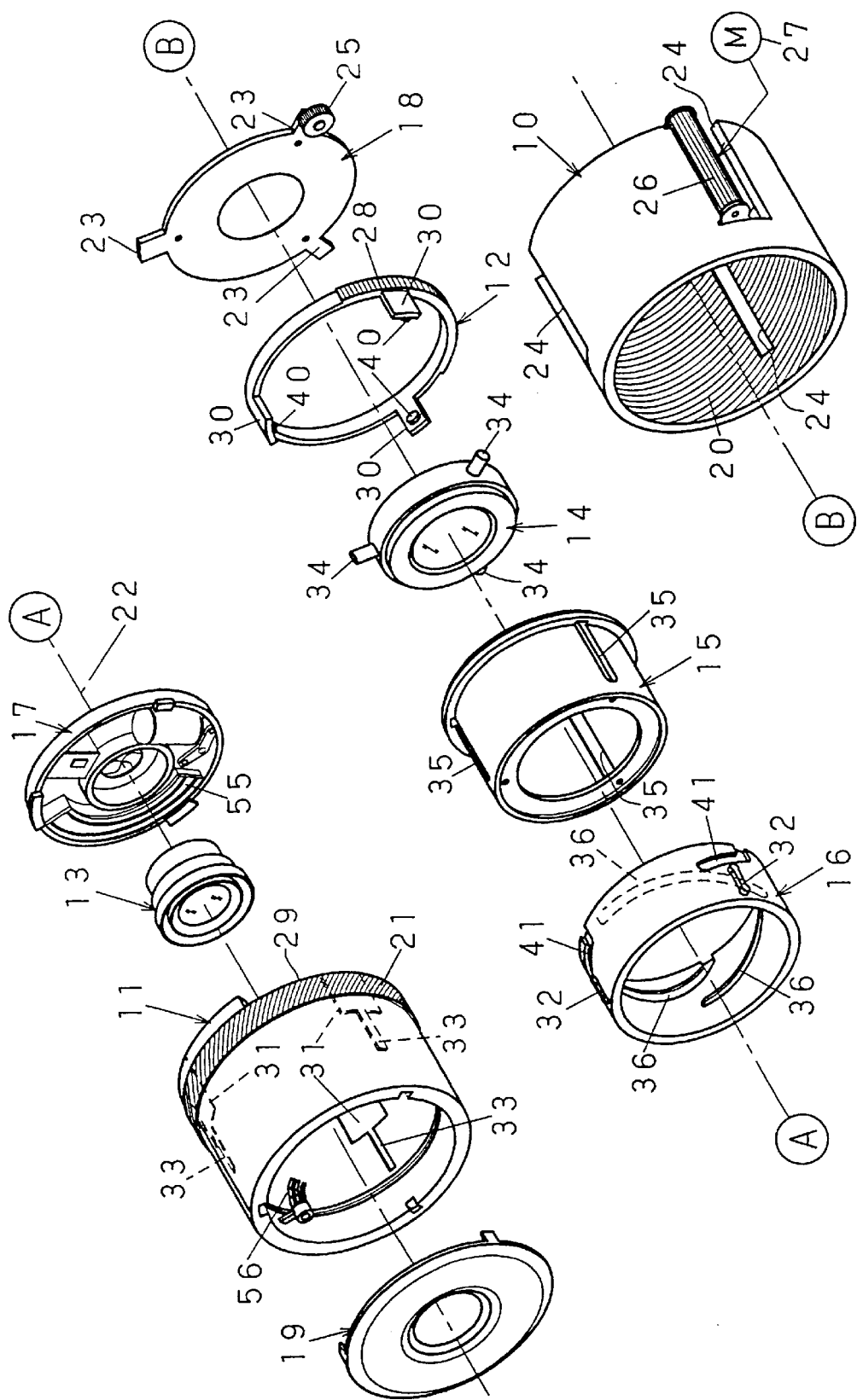
FIG. 1 is an exploded perspective view of a zoom lens device according to a first embodiment of the invention.
Figure 2:
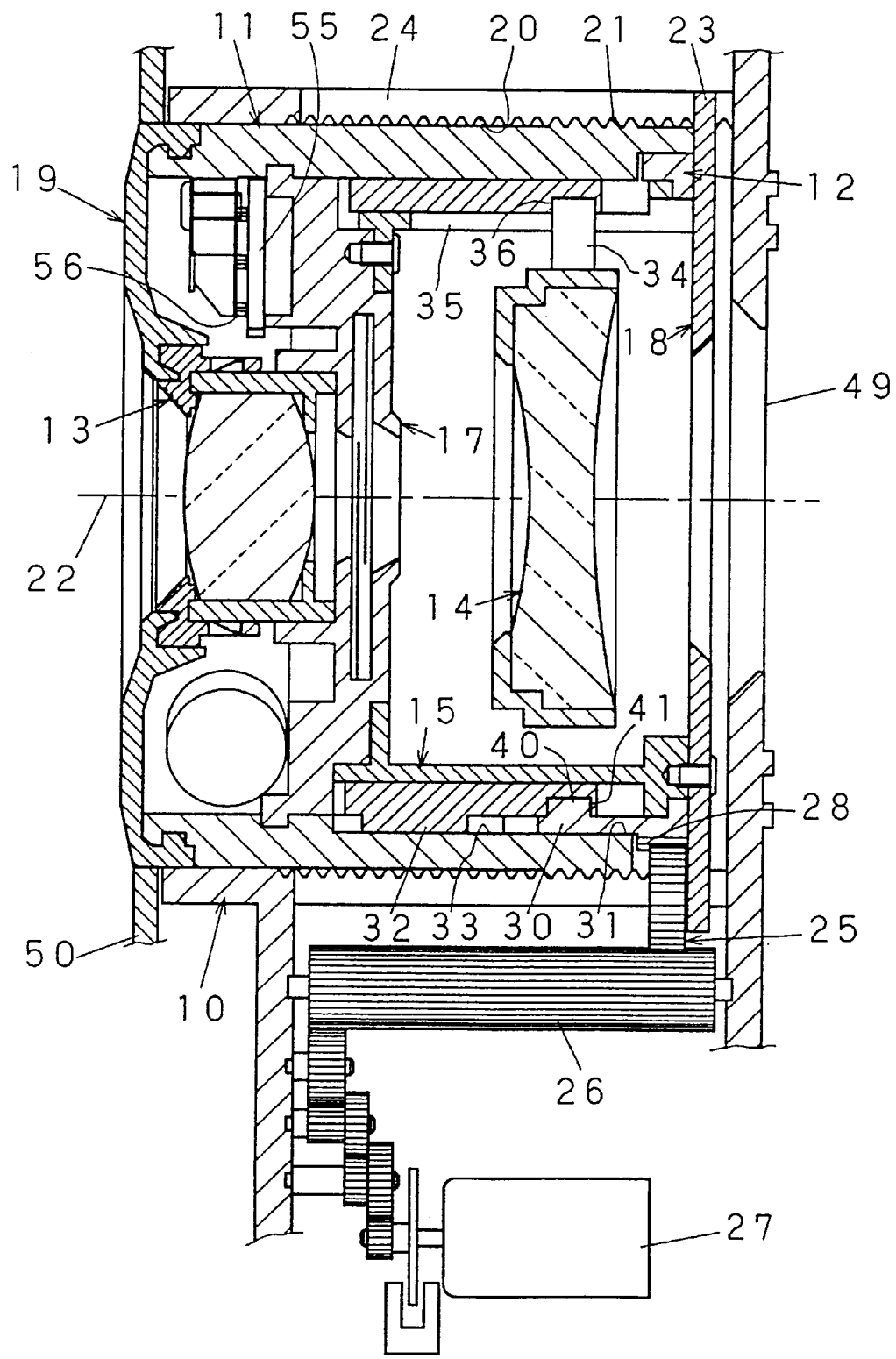
FIG. 2 is an axial sectional view of the zoom lens device of the first embodiment at a wide-angle terminal.

As shown in FIGS. 1 and 2, a zoom lens device according to a first embodiment is applied to a two component mechanical compensation type zoom lens system consisting of two lens groups. The zoom lens device is mainly constituted of a fixed barrel 10, a helical movement barrel 11, a drive ring 12, a front lens frame 13 holding a front lens group, a rear lens frame 14 holding a rear lens group, an axial movement barrel 15, a cam barrel 16, a shutter unit 17, an axial movement guide ring 18 and a decorative cover plate 19.

The fixed barrel 10 has an internal or female helicoid 20 around its inner periphery. The helical movement barrel 11 has an external or male helicoid 21 around its outer periphery, which is engaged with the internal helicoid 20 of the fixed barrel 10. Thereby the helical movement barrel 11 can rotate inside the fixed barrel 10 about an optical axis 22 of the lens system while moving in the axial direction according to the lead of the helicoids 20 and 21. The decorative cover plate 19 is attached to the front end of the helical movement barrel 11. The front lens frame 13, the shutter unit 17, the cam barrel 16, the axial movement barrel 15, the rear lens frame 14, the drive ring 12 and the axial movement guide ring 18 are mounted in the helical movement barrel 11 in this order from the front, wherein front is the objective side, and rear is the image side.

The shutter unit 17 and the axial movement guide ring 18 are secured to the front and rear ends of the axial movement barrel 15 respectively. The axial movement barrel 15, the shutter unit 17 and the axial movement guide ring 18 are movable together with the helical movement barrel 11 in the direction of the optical axis 22. The axial movement guide ring 18 has three radial projections 23 formed at regular intervals around its outer circumference. The radial projections 23 are inserted in three axial slits 24 of the fixed barrel 10, so that the axial movement barrel 15 and the shutter unit 17 cannot rotate inside the fixed barrel 10, while the helical movement barrel 11 is rotatable about the optical axis 22 relative to the axial movement barrel 15. The front lens frame 13 is secured to the front end of the shutter unit 17.

A gear 25 is mounted to one of the radial projections 23 of the axial movement guide ring 18. The gear 25 is in mesh with a drive gear 26 through one of the axial slits 24 of the fixed barrel 10. The drive gear 26 transmits the rotational movement of the motor 27 to the gear 25. The drive gear 26 has a length in its axial direction that is parallel to the optical axis 22, so the gear 25 stays in engagement with the drive gear 26 while the helical movement barrel 11 is moving along the axial direction.

The drive ring 12 is held between the rear end of the axial movement barrel 15 and the axial movement guide ring 18 so as to be rotatable about the optical axis 22. The drive ring 12 is formed with a gear 28 through a limited angular range of the outer periphery. The drive ring 12 also has three axial legs 30 spaced at regular intervals in the circumferential or rotational direction thereof. The axial legs 30 are equal in size, and are fitted into three stepped recess portions 31 of the inner periphery of the helical movement barrel 11 which are arranged in correspondence with the axial legs 30. The stepped recesses 31 have a length in the circumferential direction of the helical movement barrel 11, that is greater than a circumferential length of the axial legs 30, so that the axial legs 30 are movable inside the stepped recesses 31 in the circumferential direction through a given limited angle. The angle is given by a difference between the circumferential length of the stepped recess 31 and that of the axial leg 30. That is, the drive ring 12 is coupled to the helical movement barrel 11 as to be rotatable relative to the helical movement barrel 11 within the given angle. A cutout 29 is formed in the rear end of the helical movement barrel 11 through a limited angular range in correspondence with the gear 28, for giving the gear 25 access to the gear 28. In this way, the motor 27 can rotate the drive ring 12 through the gears 26, 25 and 28.

The cam barrel 16 is fitted onto the axial movement barrel 15 such that the cam barrel 16 is rotatable about the optical axis 22 and movable along the optical axis 22 on the axial movement barrel 15. The cam barrel 16 has three axial guide ridges 32 on its outer periphery spaced at regular intervals in the circumferential direction. The axial guide ridges 32 are engaged in three axial guide grooves 33 which are correspondingly formed the inner periphery of the helical movement barrel 11. The axial guide grooves 33 are longer in the axial direction than the axial guide ridges 32, but substantially equal in width to the axial guide ridges 32. Thus the cam barrel 16 is movable along the optical axis 22 relative to the helical movement barrel 11, but rotates together with the helical movement barrel 11.

The axial movement barrel 15 holds the rear lens frame 14 therein. The rear lens frame 14 has three cam follower pins 34 protruding radially outwardly from a holder or frame of the rear lens frame 14. The cam follower pins 34 are spaced at regular intervals in the circumferential direction, and are engaged in three cam grooves 36 through three axial guide slits 35 of the axial movement barrel 15, so that the rotation of the cam barrel 16 causes the pins to move along the cam grooves 36. The cam grooves 36 are helical about the optical axis 22 and are parallel to each other. According to this configuration, when the helical movement barrel 11 rotates, the rear lens frame 14 moves along the optical axis 22 inside the axial movement barrel 15, that is, inside the helical movement barrel 11, while being stopped from rotating by the axial guide slits 35. In this way, the rear lens frame 14 moves in the axial direction relative to the front lens frame 13, thereby varying the distance to the front lens frame 13.

Figure 3:
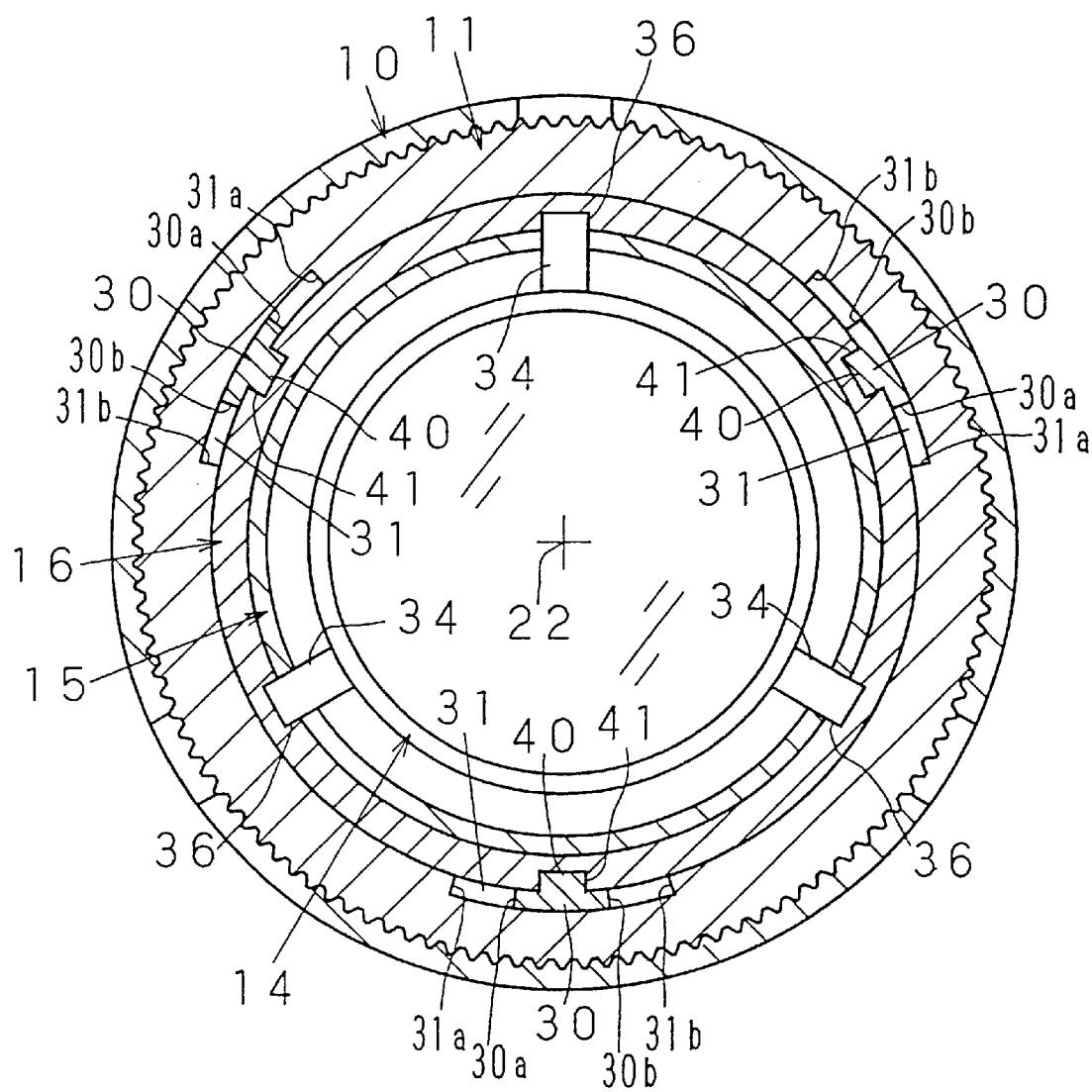
FIG. 3 is a radial sectional view of the zoom lens device of the first embodiment viewed from the film surface side.

For zooming, the drive ring 12 is rotated by the motor 27 more than the given angle allowed for the relative rotation of the drive ring 12 to the helical movement barrel 11. As shown in FIG. 3, when the drive ring 12 rotates more than the given angle, one side edges 30a or 30b of the axial legs 30 come into contact with one side walls 31a or 31b of the stepped recesses 31, so the rotation of the drive ring 12 is transmitted to the helical movement barrel 11, causing the helical movement barrel 11 to rotate together. The rotation of the helical movement barrel 11 causes the helical movement barrel 11 to move along the optical axis 22 in accordance with the lead of the helicoids 20 and 21. The front lens frame 13 is moved in the axial direction together with the helical movement barrel 11, and the cam barrel 16 is rotated together with the helical movement barrel 11. The rotation of the cam barrel 16 causes the rear lens frame 14 to move in the axial direction relative to the helical movement barrel 11 because of the engagement of the cam follower pins 34 in the cam grooves 36 through the axial guide slits 35. In this way, the axial positions of the rear lens frame 14 and the front lens frame 13 are changed to vary the focal length of the zoom lens in a continuous fashion.

Figure 5:
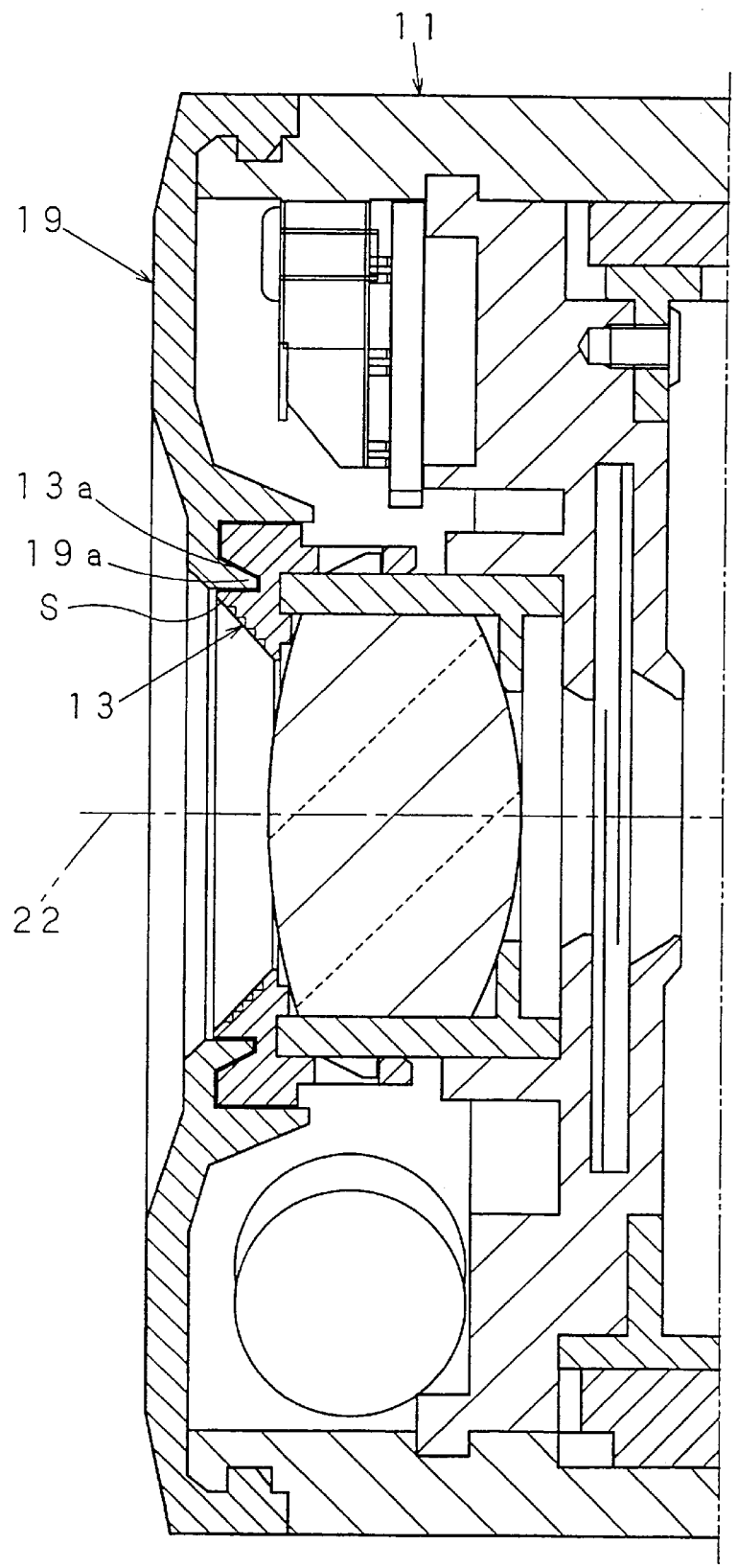
FIG. 5 is an enlarged axial sectional view showing the front portion of the zoom lens device of the first embodiment.

As the axial legs 30 moves within the stepped recesses 31, the front lens frame 13 rotates relative to the decorative cover plate 19. As shown in detail in FIG. 5, the front lens frame 13 has a circular groove 13a formed in its front face, for accepting a circular ridge 19a that is formed on the inside or rear surface of the decorative cover plate 19. A clearance S is provided between the front lens frame 13 and the decorative cover plate 19, such that the front lens frame 13 can rotate relative to the decorative cover plate 19 without any friction. Therefore, the wearing of these members 13 and 19 is little, and the driving power necessary for this relative rotation is small. Because of the labyrinthine engagement between the front lens frame 13 and the decorative plate 19, extraneous light falling into the clearance S is attenuated at the meanders of the clearance S, and does not reach inside the helical movement barrel 11.

Figure 4:
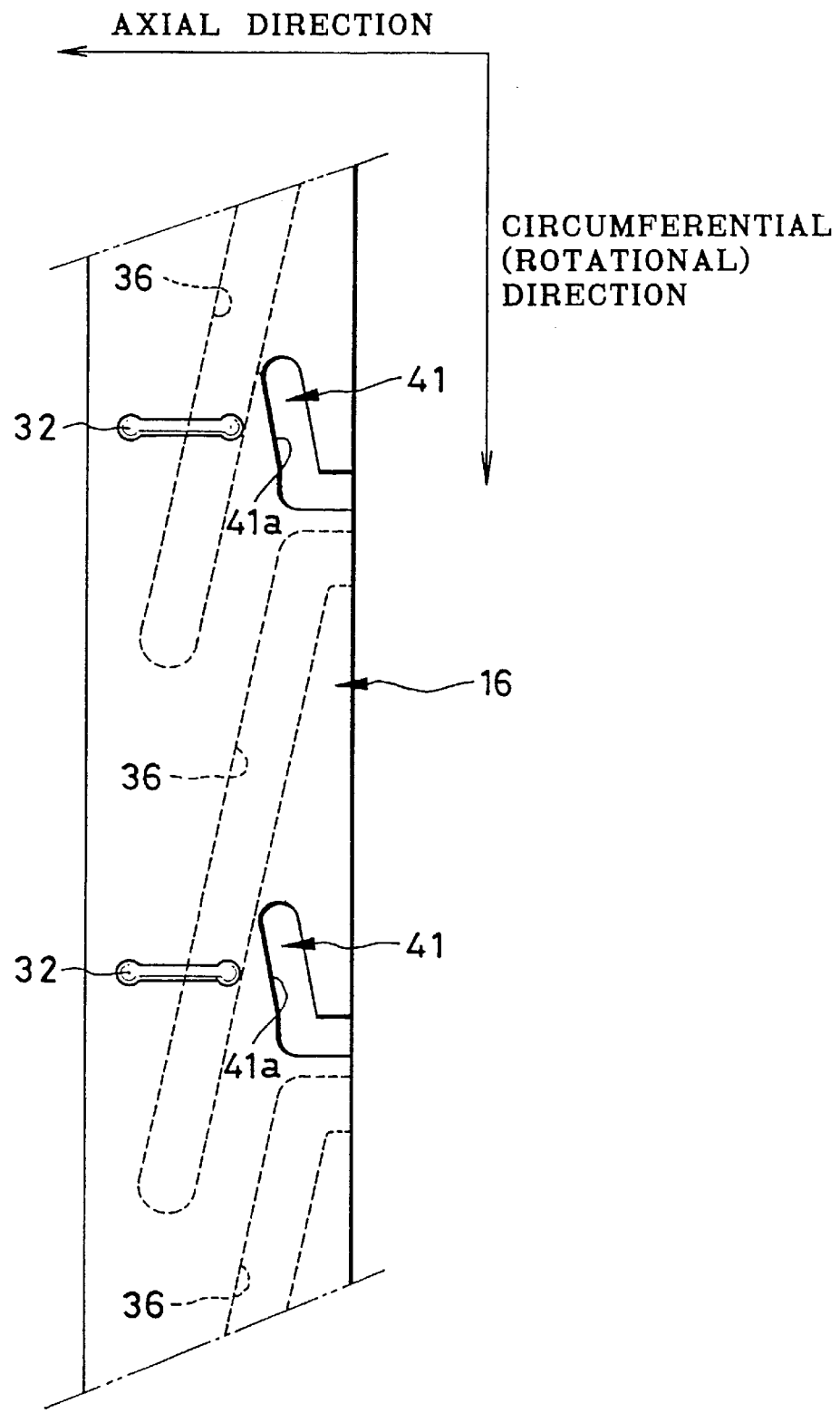
FIG. 4 is an unfolded view of a cam barrel viewed from the outer periphery.

Cam projections 40 are formed integrally on the inside surfaces of the respective axial legs 30. The cam projections 40 are engaged in three focusing cam grooves 41 which are formed around the outer periphery of the cam barrel 16 at regular intervals. As shown in detail in FIG. 4, the focusing cam grooves 41 are also helical about the optical axis 22 but have different courses from those of the cam grooves 36. For focusing, the drive ring 12 is rotated relative to the helical movement barrel 11, that is, within the given angle determined by the movable range of the axial legs 30 within the stepped recesses 31. With the relative rotation of the drive ring 12 to the helical movement barrel 11, the cam projections 40 moves along the focusing cam grooves 41.

Indeed the cam projections 40 apply forces to the cam grooves 41 both in the circumferential direction and in the axial direction, but the force necessary for rotating the helical movement barrel 11 is so large that the helical movement barrel 11 is not moved by the force applied from the cam projections 40 in the circumferential direction to the cam grooves 41. The cam barrel 16 is hindered from rotating relative to the helical movement barrel 11 because of the engagement between the axial guide ridges 32 of the cam barrel 16 and the axial guide grooves 33 of the helical movement barrel 11. Therefore, so long as the axial legs 30 move within the stepped recesses 31 and thus the driving force is applied only from the cam projections 40 to the cam grooves 41, the helical movement barrel 11 does not rotate and move, and thus the focal length is maintained unchanged. Only the cam barrel 16 is moved in the axial direction. With the axial movement of the cam barrel 16, the cam grooves 36 push the cam follower pins 34 in the axial direction, so that the rear lens frame 14 moves in the axial direction. In this way, only the rear lens frame 14 is moved for focusing.

Figure 6:
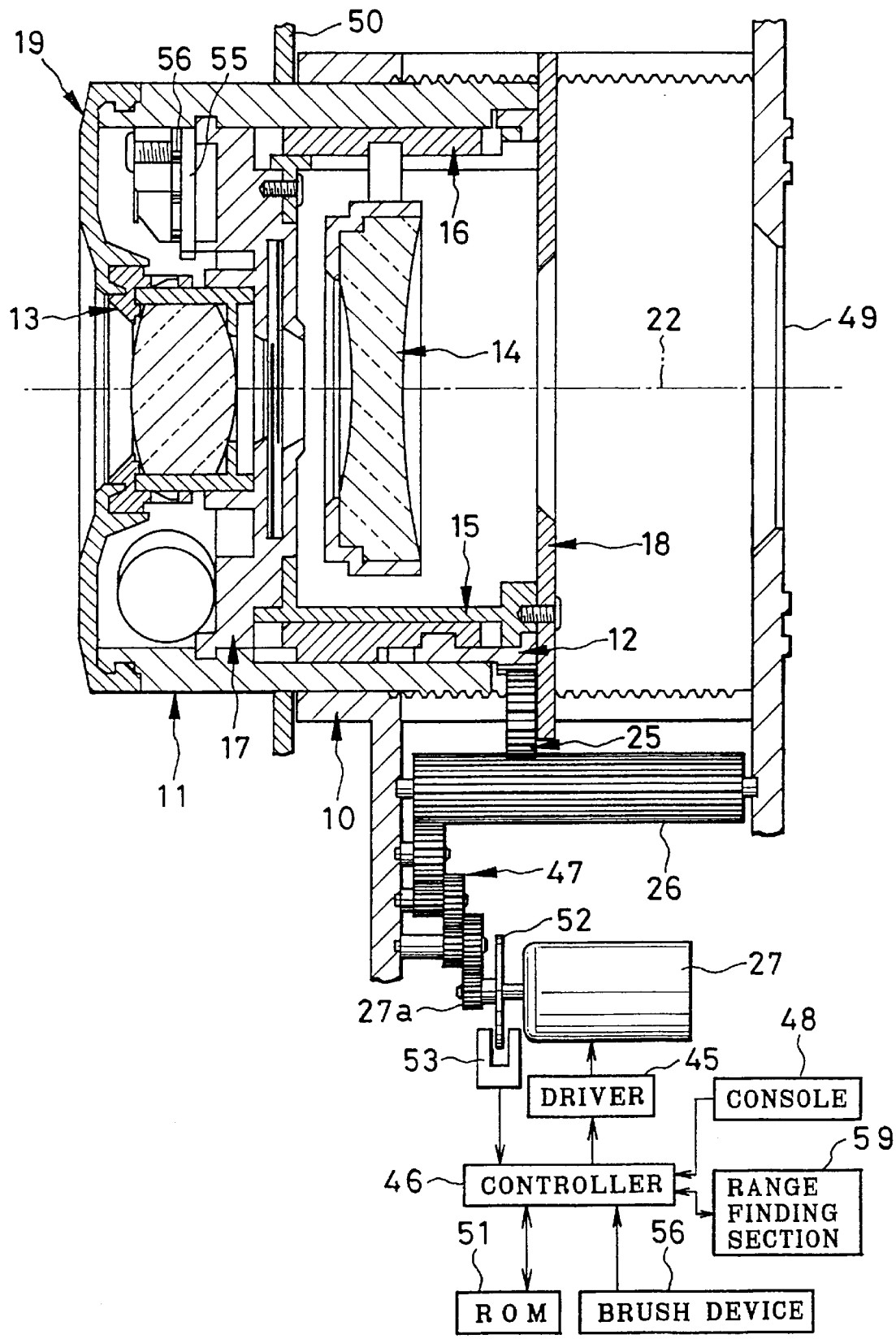
FIG. 6 is an axial sectional view of the zoom lens device of the first embodiment at a telephoto terminal.

As shown in FIG. 6, the motor 27 is driven by a controller 46 through a driver 45. There is a reduction gear train 47 from a drive shaft gear 27a of the motor 27 to the drive gear 26. The controller 46 controls zooming by driving the motor 27 in response to a zooming switch provided in a console 48. The zooming switch includes a telephoto zooming button for changing the focal length to the telephoto side, and a wide-angle zooming button for changing the focal length to the wide-angle side. In FIGS. 2 and 6, designated by 49 and 50 are a film surface and a front wall of the camera body respectively.

The controller 46 controls zooming, and then sets the lens device to one of predetermined initial focusing positions as set forth in detail below. Thereafter, responsive to a halfway depression of a shutter button, the controller 46 controls focusing. When the shutter button is pressed farther to the full, the controller 46 activates a shutter mechanism to make an exposure. Thereafter, the controller 46 resets the lens device to the initial focusing position, preparing for the next shutter button operation. The controller 46 performs these operations according to a sequence program stored in a ROM 51.

An encoder wheel 52 having radial slits is mounted on the drive shaft of the motor 27, so as to rotate together with the drive shaft. A photo sensor 53 is disposed in the course of the encoder wheel 52, to detect the slits of the encoder wheel 52 and output an encoder pulse signal to the controller 46. The controller 46 determines rotational angle of the motor 27 based on the encoder pulse signal. The controller 46 controls start and stop of the motor 27 with reference to the rotational angle during the setting to the initial focusing position and the focusing.

As described so far, according to the configuration of the present invention, it is possible to vary the focal length continuously. However, as the focusing is made by moving the rear lens frame 14 in the direction of the optical axis 22 while maintaining the zooming position unchanged, the amount of movement of the rear lens frame 14 necessary for focusing on the same subject range varies depending upon the zooming position. Therefore, it is preferable to predetermine a plurality of zooming positions at appropriate intervals so as to simplify the focusing control.

Figure 7:
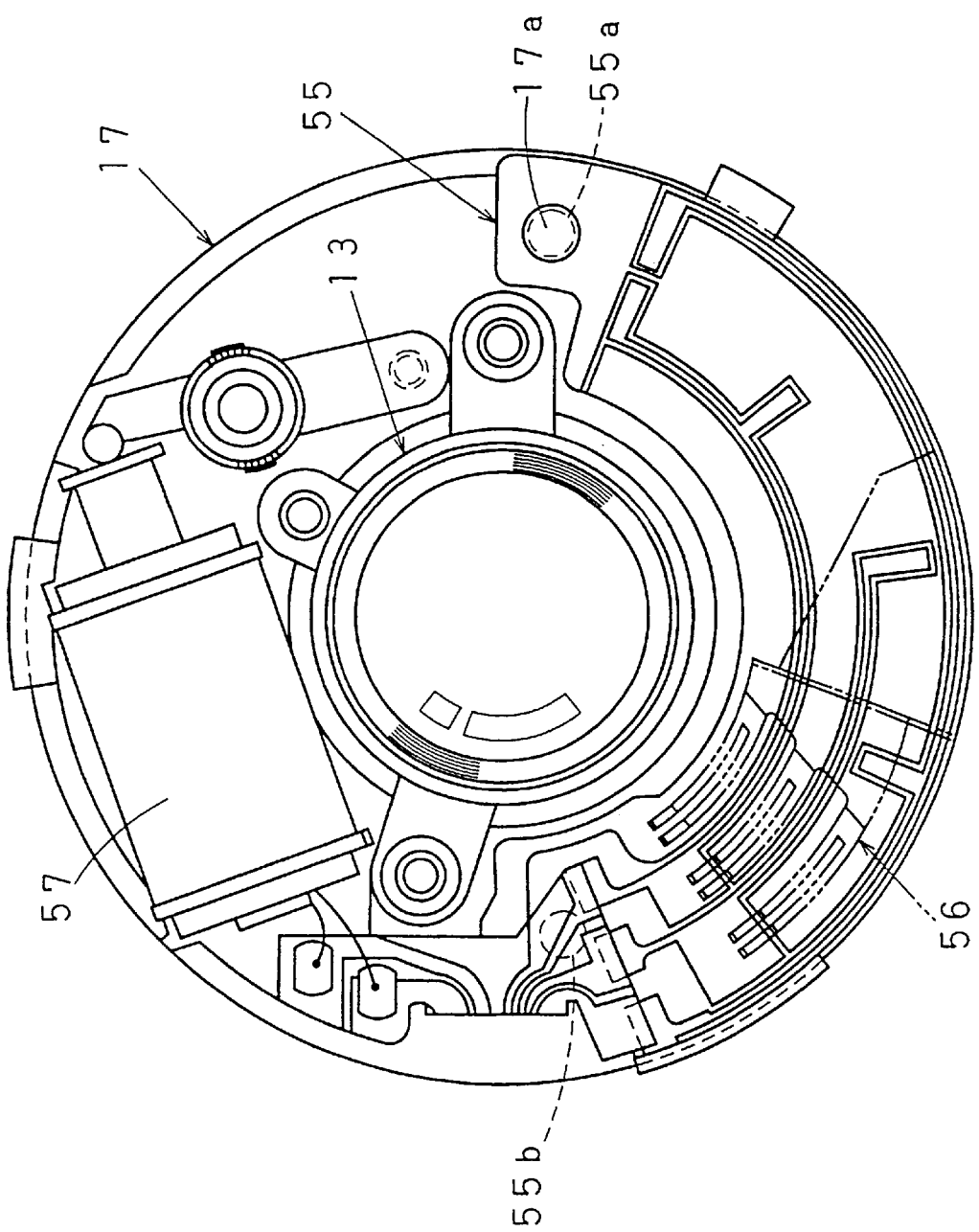
FIG. 7 is a front view of a shutter unit of the zoom lens device, having a zooming position detector and a front lens frame attached thereto.

As shown in detail in FIG. 7, the shutter unit 17 has a shutter mechanism and an actuator 57 for driving the shutter mechanism are incorporated therein. On the front face of the shutter unit 17, there is a semicircular code plate 55. A brush device 56 is secured to an inner front portion of the helical movement barrel 11, such that the brush device 56 slides on or brushes the code plate 55 with the rotation of the helical movement barrel 11. The code plate 55 and the brush device 56 constitute a zooming position detector. As the zooming position detector is located in a room between the shutter unit 17 and the decorative cover plate 19, it is unnecessary to provide a specific mounting space for the zooming position detector by enlarging the diameter of the lens device or the whole scale of the camera. The code plate 55 is easy attachable to the shutter unit 17 by use of a simple device such as bolts or heat caulking. In the shown embodiment, the code plate 55 has holes 55a and 55b at its opposite sides, and caulking bosses 17a are integrally formed with a plastic base plate of the shutter unit 17. By heat-deforming the caulking bosses 17a in the holes 55a and 55b, the code plate 55 is attached to the shutter unit 17.

The brush device 56 has a pair of signal brushes 56a and 56b and an earth brush 56c. The code plate 55 consists of three signal contact patterns Ea, Eb and Ec, and an earth contact pattern GRD. As the helical movement barrel 11 rotates, the signal brush 56a brushes the signal contact patterns Ea and Eb, and the signal brush 56b brushes the signal contact pattern 56c, whereas the earth brush 56c brushes the earth contact pattern GRD.

Figure 8:
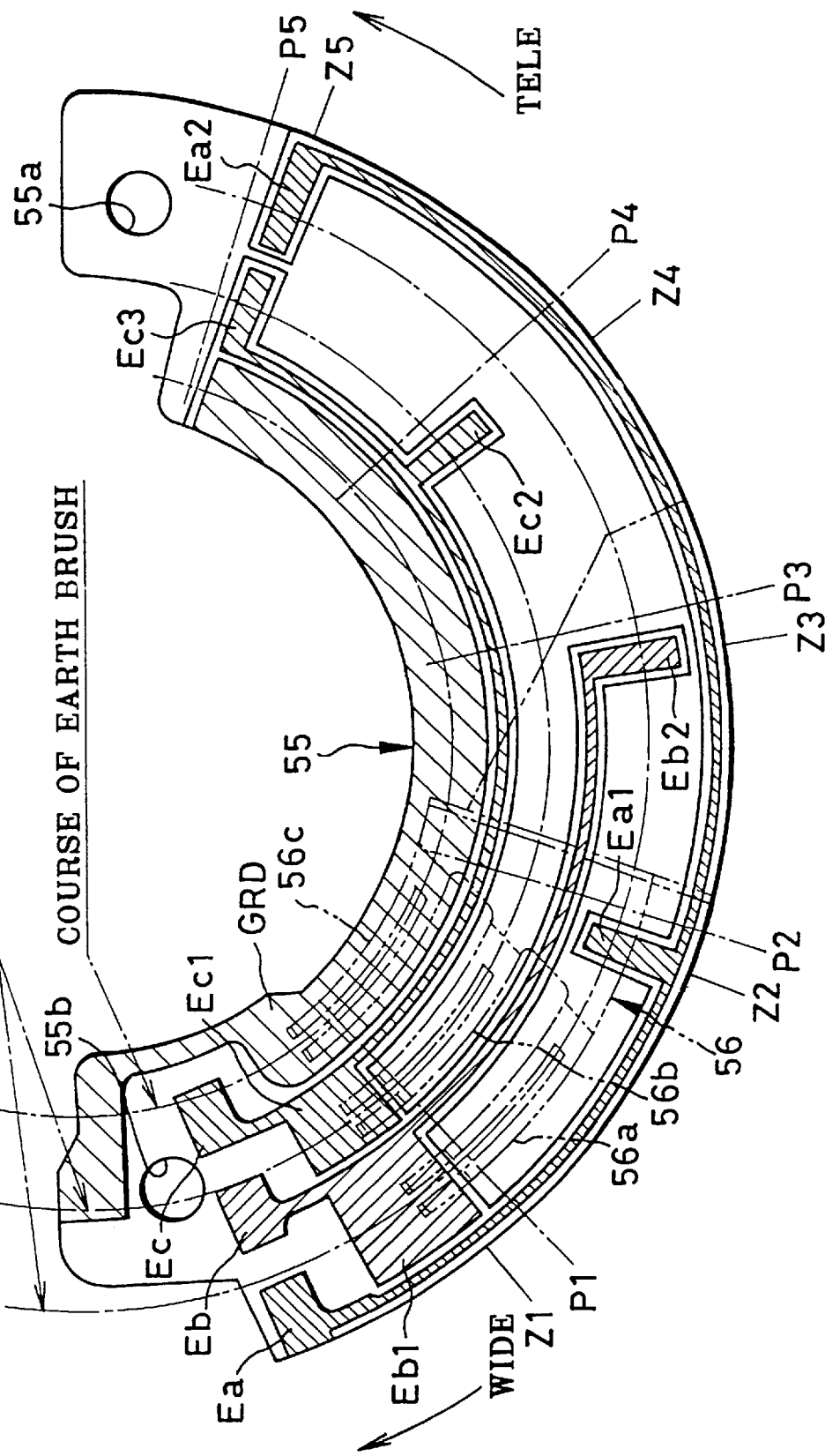
FIG. 8 is an explanatory diagram of a code plate of the zooming position detector.

In FIG. 8, contact positions Z1, Z2, Z3, Z4 and Z5 of the brush device 56 on the code plate 55 correspond to the predetermined zooming positions, wherein the contact position Z1 corresponds to the wide-angle terminal as shown in FIG. 2, the contact position Z5 corresponds to the 5 telephoto terminal as shown in FIG. 6, and the contact positions Z2, Z3 and Z4 correspond to three zooming positions between the terminals. When the helical movement barrel 11 rotates to the wide-angle terminal Z1, the signal brush 56a comes into contact with a portion Eb1 of the contact pattern Eb, whereas the signal brush 56b comes into contact with a portion Ec1 of the contact pattern Ec. When the helical movement barrel 11 rotates to the zooming position Z2, the signal brush 56a comes into contact with a portion Ea1 of the contact pattern Ea. When the helical movement barrel 11 rotates to the zooming position Z3, the signal brush 56a comes into contact with a portion Eb2 of the contact pattern Eb. When the helical movement barrel 11 rotates to the zooming position Z4, the signal brush 56b comes into contact with a portion Ec2 of the contact pattern Ec. When the helical movement barrel 11 rotates to the telephoto terminal Z5, the signal brush 56a comes into contact with a portion Ea2 of the contact pattern Ea, whereas the signal brush 56b comes into contact with a portion Ec3 of the contact pattern Ec.

The controller 46 identifies the present zooming position by signals from the signal brushes 56a and 56b. In this instance, the signals from the signal brushes 56a and 56b represent "011" for the wide-angle terminal Z1, "100" for the zooming position Z2, "010" for the zooming position Z3, "001" for the zooming position Z4, and "101" for the telephoto terminal Z5.

The controller 46 controls zooming by driving the motor 27 to rotate in forward or reverse direction depending upon whether the telephoto zooming button or the wide-angle zooming button is operated. When the operation on the zooming button is terminated, the controller 46 decelerates the motor 27. Thereafter when the signal brushe 56a or 56b outputs a signal, the controller 46 stops the motor 27. Thus, after the zooming, the zoom lens device always stops at one of the predetermined zooming positions Z1 to Z5 where at least one of the signal brushes 56a and 56b is in contact with any of the contact patterns Ea to Ec.

In order to detect the focusing position with accuracy, it is desirable to detect the position of the cam barrel 16 in the axial direction by a specific position detector. In order to cut the cost, however, the above-described zooming position detector may double as an initial focusing position detector. Specifically, the helical movement barrel 11 is rotated a little from the present zooming position to the telephoto side till the cam projections 40 move to one terminals of the cam grooves 41. In this position, the cam barrel 16 moves to a rearmost position or the nearest position to the film surface 49 in its axial movement range. In result, the signal brush 56a or 56b moves from the zooming position to one of the initial focusing positions P1, P2, P3, P4 and P5 that are located on the telephoto side of the respective zooming positions.

For focusing, the controller 46 drives a range finding section 59 to obtain a subject distance, and determines a pulse number corresponding to the subject distance with reference to the ROM 51. Thereafter, the controller 46 rotates the motor 27 in the forward direction to rotate the helical movement barrel 11 to the telephoto side. As soon as the signal brushes 56a and 56b are put out of the signal contact pattern Ea to Ec, the controller 46 decelerates the motor 27 and starts counting pulses from the photo sensor 53. The controller 46 first counts down the photo sensor pulses from a constant pulse number that is stored in the ROM 51 and is given for setting the lens device from any of the zooming positions Z1 to Z5 to the nearest one of the initial focusing position. Accordingly, when the count comes down to zero, the controller 46 starts counting up the pulses from the photo sensor 53, and compares the count to the pulse number corresponding to the subject distance. When the count reaches the pulse number determined by the subject distance, the controller 46 stops the motor 27. The drive ring 12 rotates within the given angle for focusing, so that the helical movement barrel 11 does not rotate during the focusing.

Since the amount of axial movement of the rear lens group 14 necessary for focusing varies even on the same subject distance depending upon the zooming position, the ROM 51 stores different pulse numbers to the same subject distance for the respective zooming positions. When a shutter release operation has been made after the focusing, the controller 46 drives the motor 27 to rotate in the reverse direction to rotate the helical movement barrel 11 to the wide-angle side till the signal brush 56a or 56b gets back to the preceding zooming position. Then the controller 46 stops the motor 27 for a moment, and makes the same control as above to set the signal brush 56a or 56b to one of the initial focusing positions P1 to P5 nearest to the preceding zooming position. In this way, the zoom lens device is positioned at one of the initial focusing positions P1 to P5 without the need for any specific position detector separately from the zooming position detector that consists of the code plate 55 and the brush device 56.

As described above, the cam follower pins 34 of the rear lens frame 14 are engaged in the axial guide slits 35 of the axial movement barrel 15 and the cam grooves 36 of the cam barrel 16, such that the rear lens frame 14 moves along with the movement of cross points between the cam grooves 36 and the axial guide slits 35 that is caused by the rotation of the cam barrel 16 with the helical movement barrel 11.

Now the operation of the zoom lens device having the above described construction will be described.

The driving power of the motor 27 is transmitted to the gear 25 through the drive shaft gear 27a, the reduction gear train 47 and the drive gear 26. The rotational movement of the gear 25 is transmitted to the drive ring 12. When the front lens frame 13 and the rear lens frame 14 are in the wide-angle terminal as shown in FIG. 2 where the zoom lens device is fully retracted, the signal brushes 56a and 56b are set at the initial focusing position P1 nearest to the contact pattern portions Eb1 and Ec1. In any of the initial focusing positions P1 to P5, one side edges 30a of the axial legs 30 are in contact with the side walls 31a of the stepped recesses 31, whereas the cam projections 40 are located at their nearest positions to closed ends of the cam grooves 41, where the cam barrel 16 is in its rearmost position of its axial movement range.

Responsive to a halfway depression of the shutter button at the wide-angle terminal, the controller 46 drives the range finding section 59 to measure a subject distance, and reads out a pulse number corresponding to the subject distance and the constant pulse number for the initial focusing position setting the ROM 51. Thereafter, the controller 46 drives the motor 27 in the reverse direction while counting down the pulses of the photo sensor 53 from the constant pulse number. When the count comes down to zero, the controller 46 starts counting up the pulses of the photo sensor 53. When the count comes up to the pulse number corresponding to the subject distance, the controller 46 stops the motor 27.

Although the reverse direction of the motor 27 is the direction to rotate the helical movement barrel 11 to the wide-angle side, the helical movement barrel 11 does not rotate during focusing because the rotation of the motor 27 in the reverse direction is within the limited angular range for focusing. Merely the drive ring 12 and thus the cam projections 40 rotates to the wide-angle side. Since the axial guide ridges 32 of the cam barrel 16 are engaged in the axial guide grooves 33 of the helical movement barrel 11, the cam projections 40 move inside the cam grooves 41 while pushing front walls 41a of the cam grooves 41 in the direction of the optical axis 22, thereby causing the cam barrel 16 to move forward along the optical axis 22. When the controller 46 stops the motor 27 upon counting up to the pulse number corresponding to the subject distance, the cam projections 40 move to a focusing position inside the cam groove 41 that is determined by the subject distance. The movement of the cam barrel 16 caused by the movement of the cam projections 40 is transmitted to the cam follower pins 34 through the cooperation between the cam grooves 36 and the axial guide slits 35, so that the rear lens frame 14 moves axially along with the cam barrel 16. In this embodiment, the focusing is performed by shifting the focus from a nearest range to an infinity range.

When the photographer further press the shutter button to the full, the controller 46 activates the shutter mechanism. After the exposure, the controller 46 resets the zoom lens device to the preceding initial focusing position. First the controller 46 drives the motor 27 in the reverse direction. Since the reverse rotational direction of the motor 27 is the direction to rotate the helical movement barrel 11 to the wide-angle side, the other side edges 30b of the axial legs 30 are brought into contact with the other side walls 31b of the stepped recesses 31. Further rotation of the motor 27 in the reverse direction is transmitted to the helical movement barrel 11 through the drive ring 12, rotating the helical movement barrel 11 to the wide-angle side.

The controller 46 rotates the motor 27 in the reverse direction till the signal brushes 56a and 56b come into contact with the contact pattern portions Eb1 and Ec1. Then the controller 46 rotates the motor 27 in the forward direction till the signal brushes 56a and 56b are put off the contact patterns Eb and Ec. That is, the drive ring 12 is rotated beyond the given angle, bringing the side edges 30a of the axial legs 30 into contact with the side walls 31a of the stepped recesses 31, and rotating the helical movement barrel 11 to the telephoto side. When the signal brushes 56a and 56b leave the contact patterns Eb and Ec, the controller 46 decelerates the motor 27, and starts counting the pulses from the photo sensor 53. When the count reaches the pulse number for initial focusing position, the controller 46 stops the motor 27. In this way, the signal brushes 56a and 56b are placed at the initial focusing position P1, while the side edges 30a of the axial legs 30 are in contact with the side walls 31a of the stepped recesses 31, and the cam projections 40 are placed at the nearest position to the closed ends of the focusing cam grooves 41. Therefore, the cam barrel 16 is shifted to its rearmost position relative to the axial movement barrel 15.

When zooming to the telephoto side, the motor 27 is rotated in the forward direction so much that the drive ring 12 is rotated beyond the given angle, pushing the side walls 31a of the stepped recesses 31 of the helical movement barrel 11 by the side edges 30a of the axial legs 30. The rotation of the helical movement barrel 11 in this direction causes the helical movement barrel 11 to move forward in the direction of the optical axis 22 according to the lead of the helicoids 20 and 21. Along with the axial movement of the helical movement barrel 11, the front lens frame 13, the rearmost lens frame 14 and the axial movement barrel 15 moves in the axial direction.

The cam barrel 16 also rotates together with the helical movement barrel 11 because the axial guide grooves 33 and the axial guide ridges 32. Since the cam projections 40 are located at the nearest positions to the closed ends of the focusing cam grooves 41, the cam barrel 16 rotates in its rear position relative to the axial movement barrel 15. When the cam barrel 16 is rotated by the forward rotation of the motor 27, the rear lens frame 14 moves forward inside the helical movement barrel 11 while being prevented from rotating by the cooperation between the axial guide slits 35 and the cam grooves 36. Thereby, the distance from the rear lens frame 14 to the front lens frame 13 is reduced.

After the zooming to the telephoto side is complete, the motor 27 is stopped when the signal brushe 56a or 56b comes into contact with the next pattern portion, e.g. Ea1, in the zooming direction to the telephoto side that corresponds to the forward rotation of the motor 27. The side edges 30a of the axial legs 30 stay in contact with the side walls 31a of the stepped recesses 31 during the zooming to the telephoto side. Thereafter, the controller 46 rotates the motor 27 further in the forward direction for setting the zoom lens device to the initial focusing position till counting up to the constant pulse number after the signal brushes 56a and 56b are put off the contact patterns Ea and Eb.

When zooming to the wide-angle side, the motor 27 is rotated in the reverse direction so much that the drive ring 12 is rotated beyond the given angle, pushing the side walls 31b of the stepped recesses 31 of the helical movement barrel 11 by the side edges 30b of the axial legs 30. The rotation of the helical movement barrel 11 in this direction causes the helical movement barrel 11 to move rearward. Since the cam projections 40 are located at nearest positions to open ends of the focusing cam grooves 41 during the zooming to the wide-angle side, the cam barrel 16 rotates together with the helical movement barrel 11 in its foremost position relative to the axial movement barrel 15. When the cam barrel 16 is rotated by the reverse rotation of the motor 27, the rear lens frame 14 moves rearward inside the helical movement barrel 11, so that the distance from the rear lens frame 14 to the front lens frame 13 increases.

After the zooming to the wide-angle side is complete, the motor 27 is stopped when the signal brushe 56a or 56b comes into contact with the next pattern portion in the zooming direction to the wide-angle side that corresponds to the reverse rotation of the motor 27. The side edges 30b of the axial legs 30 stay in contact with the side walls 31b of the stepped recesses 31 during the zooming to the wide-angle side. Therefore, the controller 46 rotates the motor 27 in the forward direction to rotate the drive ring 12 beyond the limited angle, for setting the zoom lens device to the initial focusing position after the zooming to the wide-angle side. Thereby, the side edges 30a are brought into contact with the side walls 31a. Thereafter, the helical movement barrel 11 is rotated to the telephoto side till the pulses from the photo sensor 53 is counted up to the constant pulse number from the time when the signal brushes 56a and 56b are put off the contact patterns Ea and Eb. In this way, regardless of the zooming direction and the zooming position, the cam projections 40 are set to the nearest positions to the closed ends of the focusing cam grooves 41. That is, the cam barrel 16 is always set in the same axial position relative to the helical movement barrel 11 at the start of focusing.

Figure 9:
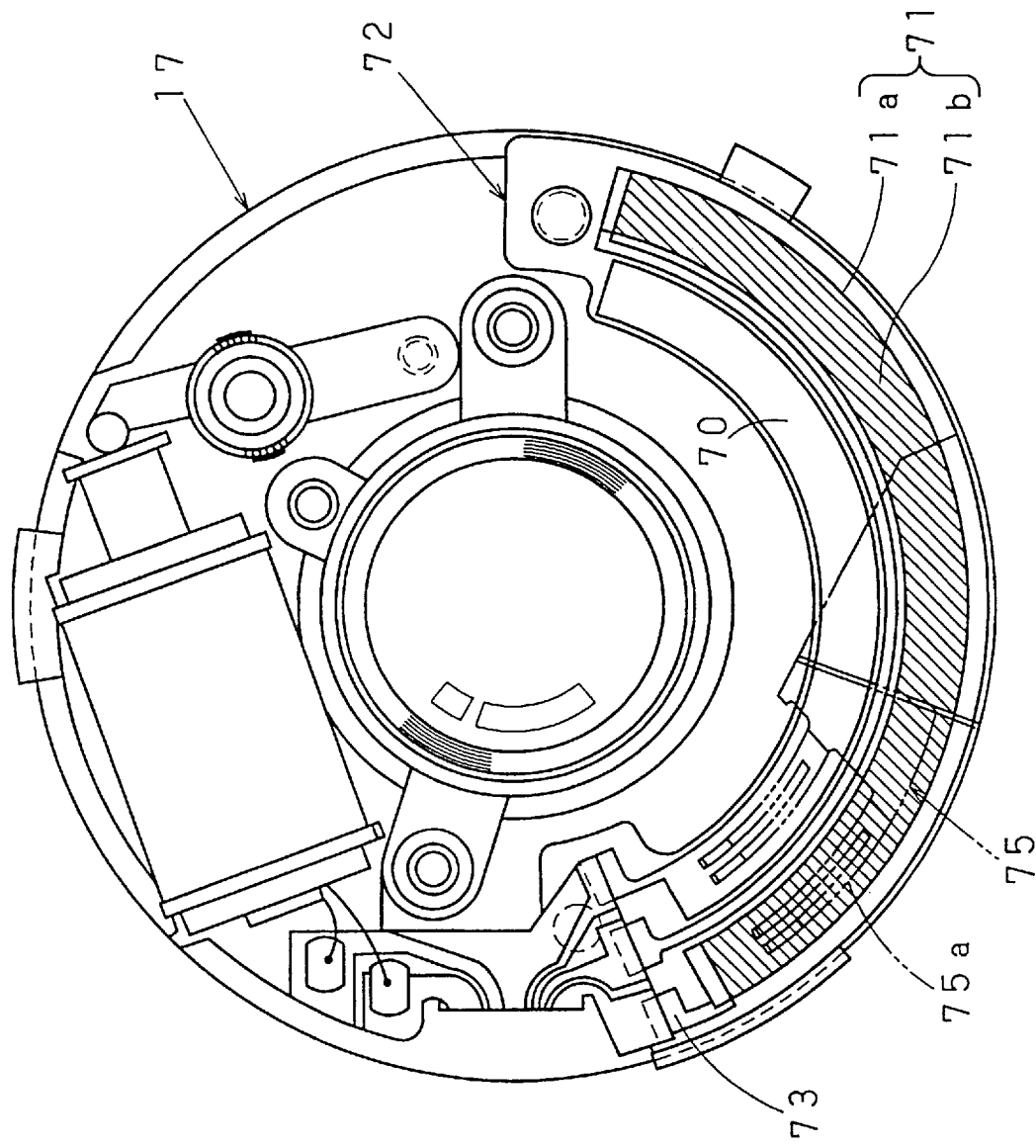
FIG. 9 is a front view of a shutter unit having a code plate according to a second embodiment.

The code plate 55 having the code patterns 56a, 56b and 56c may be replaced by a code plate 72 as shown in FIG. 9. The code plate 72 has an earth pattern 70 and a resistor pattern 71. The resistor pattern 71 consists of a conductor layer 71a that extend along a semi-circular course of a signal brush 75a of a brush device 75 and a resistor layer 71b that is provided on the conductor layer 71a as shown by hatching. The resistance of the resistor pattern 71 increases with the distance from an electrode 73. Accordingly, the potential difference between the resistor pattern 71 and the earth pattern 70, i.e. the voltage of the output signal from the brush device 75 increases as the signal brush 75a removes from the electrode 73, that is, as the lens device is zoomed to the telephoto side.

In the above embodiment, the code plate 55 is mounted to the shutter unit 17, and the brush device is mounted to the helical movement barrel 11. However, it is possible to mount a code plate to the inner periphery of the helical movement barrel, and a brush device to the shutter unit 17. It is also possible to mount a brush device to the shutter unit 17, and a code plate to a rear side of a decorative cover plate that is secured to the front of a helical movement barrel. In other words, accordidng to the present invention, the brush device and the code plate of the zooming position detector of the present invention may be respectively mounted to those two parts of the lens barrel which are adjacent to each other and rotate relative to each other for zooming.

Although the first embodiment has been described with respect to a two component mechanical compensation type zoom lens device consisting of two lens groups, the first embodiment is applicable to other types of lens device. Also the light-shielding device of the invention is applicable to other types of lens device for preventing extraneous light from entering through a clearance between a front cover member of the lens device, e.g. a decorative cover plate, and a member, e.g. a front lens frame, that is placed behind the front cover member and rotates relative to the front cover member. The shape of labyrinth of the clearance between the decorative cover plate and the front lens frame is not limited to that shown in the drawings. Instead of the circular groove 13a and the circular ridge 19a, it is possible to form a circular groove in the rear surface of a decorative cover plate and a circular ridge on the front side of a front lens frame.

Meanwhile, where a front lens frame or a rear lens frames is engaged with a lens barrel or the like through a helicoid engagement or an engagement between cam grooves and cam follower pins, a play or clearance is provided in the engaged portions for allowing relative movement of the lens frame to the barrel. Without any measure, the play causes fluctuation or inclination of the lens frame in the direction of an optical axis of the lens system. To avoid such trouble, it is known in the art to throw a coil spring across the front and rear lens frames so the helicoid or the cam follower pin of the lens frame is kept in contact with the same side of the helicoid or the cam groove.

However, because there are many restrictions on the coil spring, such as closed height, deflection and required load, the design of the lens device, including the distance between the front and rear lens frames, is also restricted.

Moreover, where the minimum distance between the front and rear lens frames differs for much from the maximum distance, the resilience of the coil spring increases at the minimum use length should be large enough. As a result, the load of the coil spring and thus the rotational torque of the lens barrel vary so much that where the lens barrel is moved by an electromagnetic motor the zooming speed becomes unstable. Since the power of the motor is determined by the largest possible rotational torque of the lens barrel, the power is wasted in other variation range of the rotational torque. It is possible to reduce the load of the coil spring at the minimum use length by reducing the spring constant of the coil spring. But the spring constant can only be reduced by reducing the wire diameter of the coil spring or by elongating the free length or height of the coil spring. Accordingly, reducing the spring constant makes it difficult to assemble the coil spring in the lens barrel.

Figure 10:
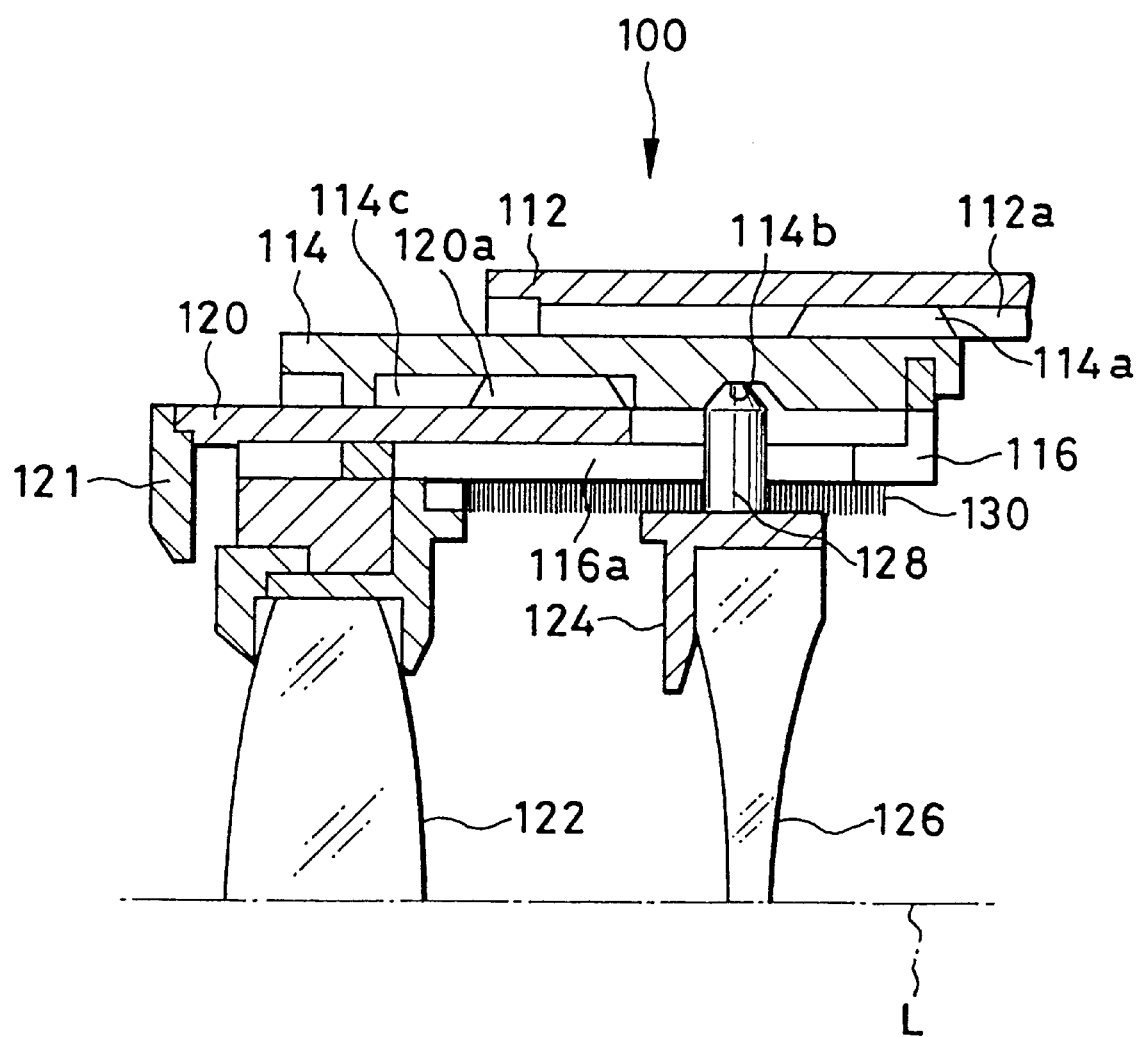
FIG. 10 is an axial sectional view of essential parts of a zoom lens device according to a third embodiment of the present invention.

FIG. 10 shows essential parts of a zoom lens barrel 100 according to another embodiment of the invention, that solves the above problem due to the play in the engagement between the lens frame and the lens barrel. An outermost barrel 112 is fixed at its rear end to a not-shown camera body. The fixed barrel 112 has a female helicoid 112a around its inner periphery. A helical movement cam barrel 114 has a male helicoid 114a around its outer periphery near the rear end, which is engaged with the helicoid 112a. The helical movement cam barrel 114 is driven by a not-shown motor to move in the direction of an optical axis L while rotating about the optical axis. Designated by 121 is a front cover plate.

The helical movement cam barrel 114 holds an axial movement barrel 116 therein, such that the axial movement barrel 116 is rotatable relative to the helical movement cam barrel 114 and movable in the axial direction together with the helical movement cam barrel 114. A substantially cylindrical front lens frame 120 holding a front lens group 122 is fitted in between the axial movement barrel 116 and the helical movement cam barrel 114 so as to be movable relative to the barrels 116 and 114. The front lens frame 120 has a male helicoid 120a around its outer periphery near the rear end, which is engaged in a female helicoid 114c that is formed around the inner periphery of the helical movement cam barrel 114 near the front end. The axial movement barrel 116 stops the front lens frame 120 from rotating, so that the front lens frame 120 moves in the axial direction while the helical movement cam barrel 114 rotates.

Figure 11:
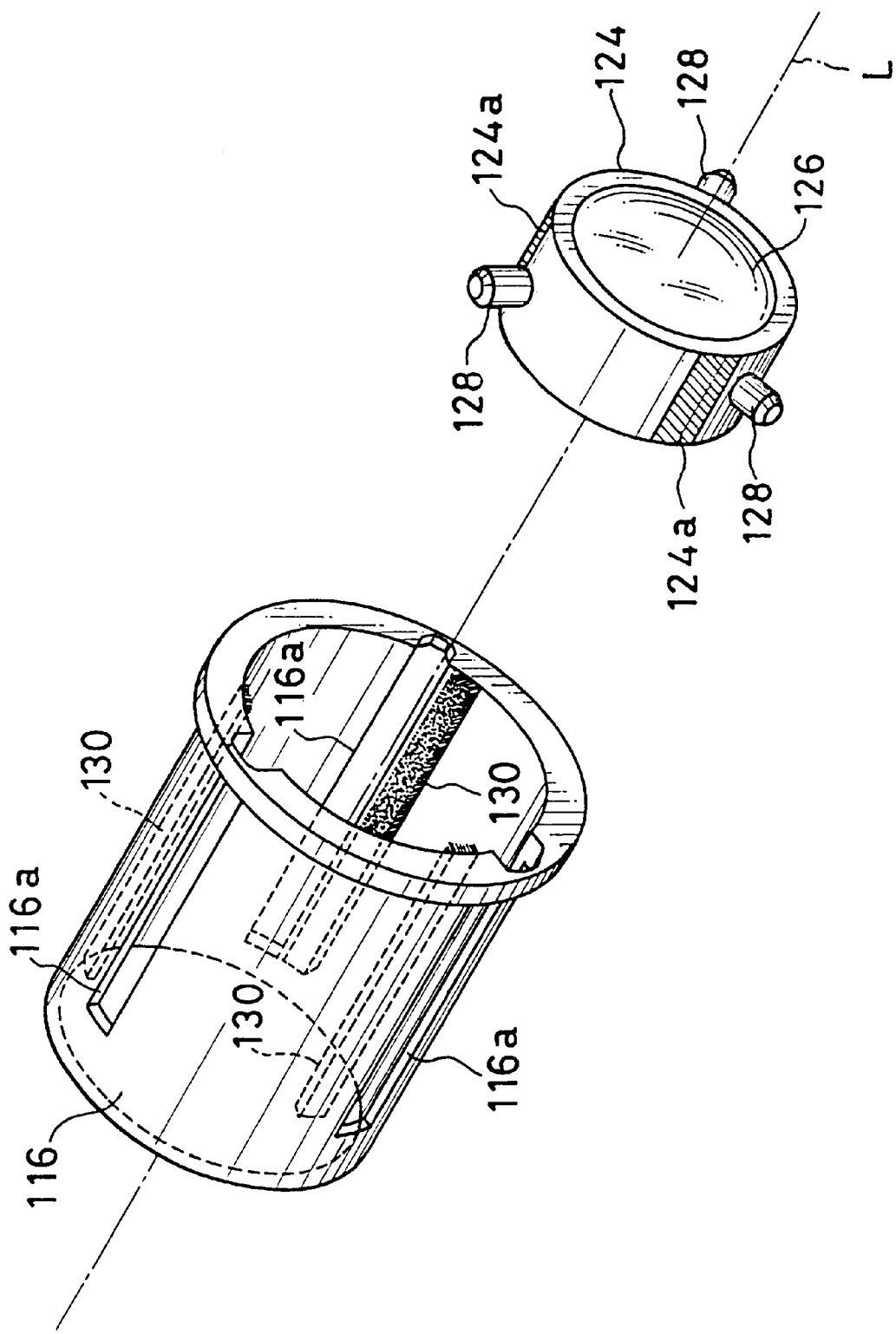
FIG. 11 is an exploded perspective view of a rear lens frame and an axial movement barrel having synthetic fiber strips as a resilient device according to the third embodiment.

A rear lens frame 124 holding a rear lens group 126 has three radial cam follower pins 128 arranged around its outer periphery at intervals of 120 degrees, as shown in detail in FIG. 11. Correspondingly, the axial movement barrel 116 has three axial slits 116a that extend in parallel to the optical axis L. Through the axial guide slits 116a of the axial movement barrel 116, the cam follower pins 128 are engaged in three axial cam grooves 114b formed in the inner periphery of the helical movement cam barrel 114, as shown in detail in FIG. 12.

A strip of resilient synthetic fiber 130 is cemented to the inner periphery of the axial movement barrel 116 in parallel to each axial slit 116a, such that the rear lens frame 124 contacts the synthetic fiber strips.130 at its three outer peripheral zones 124a shown by hatching. While the front lens frame 120 moves in the axial direction along with the rotation of the helical movement cam barrel 114, the rear lens frame 124 moves in the axial direction as the cam follower pins 128 being guided along the axial slits 116a of the axial movement barrel 116. Because of the friction between the rear lens frame 124 and the synthetic fiber strips 130, the cam follower pins 128 are leaned on one side walls of the cam grooves 114b of the helical movement cam barrel 114. Thereby, the cam follower pins 128 stably slide along the axial slits 116a. Zooming is performed by changing the distance between the front lens frame 120 and the rear lens frame 124 in this way.

To zoom the zoom lens barrel 100 to the wide-angle side, the rear lens frame 124 is moved rearward, i.e. away from the front lens frame 120. At that time, because of the friction between the outer periphery of the rear lens frame 124 and the synthetic fiber strips 130, a power against the movement of the rear lens frame 124 is applied to the rear lens frame 124. Since the rear lens frame 124 moves rearward, i.e. to the right side in FIG. 10, the cam follower pins 128 lean on the front walls of the cam grooves 114b, i.e. the left side wall of the cam grooves 114b in FIGS. 10 and 12.

To zoom the zoom lens barrel 100 to the telephoto side, the rear lens frame 124 is moved forward, i.e. toward the front lens frame 120. Also in this direction, the friction between the outer periphery of the rear lens frame 124 and the synthetic fiber strips 130 applies a power against the movement of the rear lens frame 124 to the rear lens frame 124, so that the cam follower pins 128 lean on the rear walls of the cam grooves 114b.

Accordingly, the rear lens frame 124 moves along with the helical movement cam barrel 114 without fluctuation or inclination, so that it is possible to control the distance between the front lens group 122 and the rear lens group 126 with accuracy. Moreover, because the frictional power between the rear lens frame 124 and the helical movement cam barrel 114 is maintained unchanged in both zooming directions, the load on the zoom lens barrel 100 is maintained unchanged. Therefore the torque for moving the lens barrel 100 may always be constant, and thus the workability of the zoom lens barrel 100 is improved.

As the synthetic fiber strips 130 are provided in a clearance between the outer periphery of the rear lens frame 124 and the inner periphery of the axial movement barrel 116, the synthetic fiber strips 130 do not need any specific space and are preferable in terms of compactness. The synthetic fiber strips 130 may be replaced by any resilient members such as polyester films that give an appropriate frictional resistance against the movement of the rear lens frame 124. It is alternatively possible to put resilient members on the cam follower pins 128 such that the resilient members are kept in contact with the inner periphery of the axial movement barrel 116.

Figure 12:
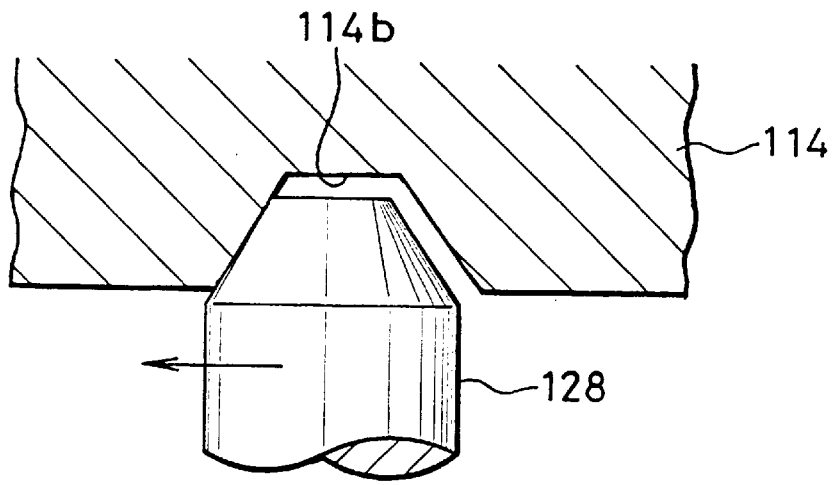
FIG. 12 is an enlarged view of a cam follower pin of the rear lens frame and a cam groove of a helical movement cam barrel of the third embodiment.
Figure 13:
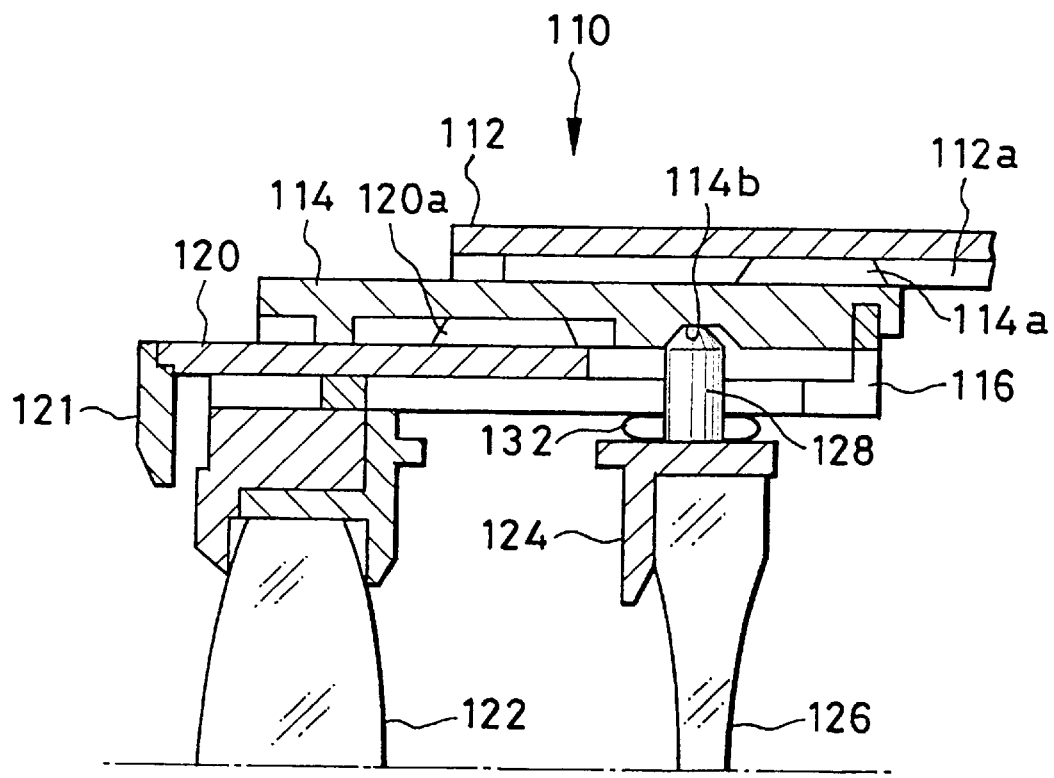
FIG. 13 is an axial sectional view of essential parts of a zoom lens device according to a fourth embodiment of the present invention.
Figure 14:
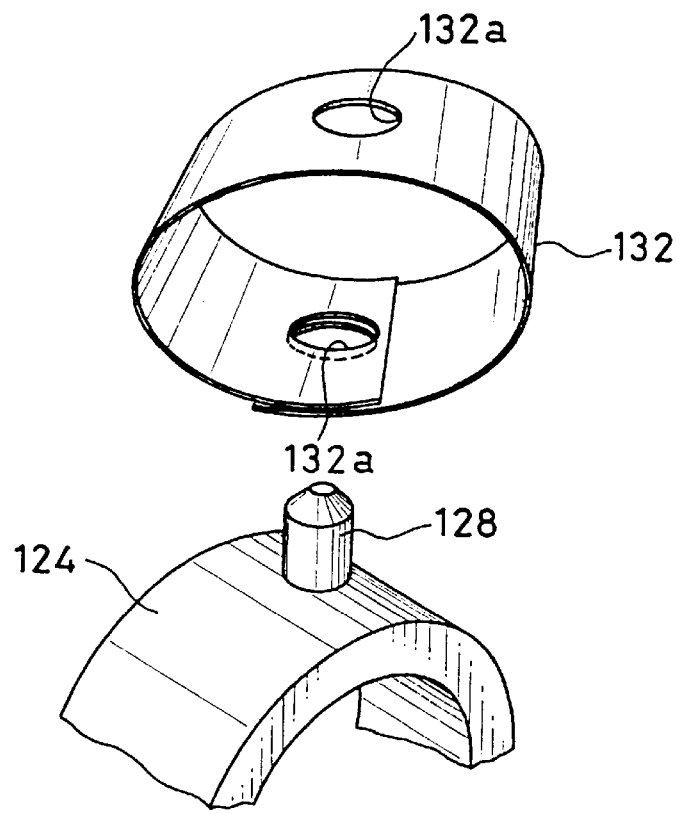
FIG. 14 is an enlarged view of a cam follower pin of a rear lens frame and a polyester film ring as a resilient device according to the fourth embodiment.
Figure 15:
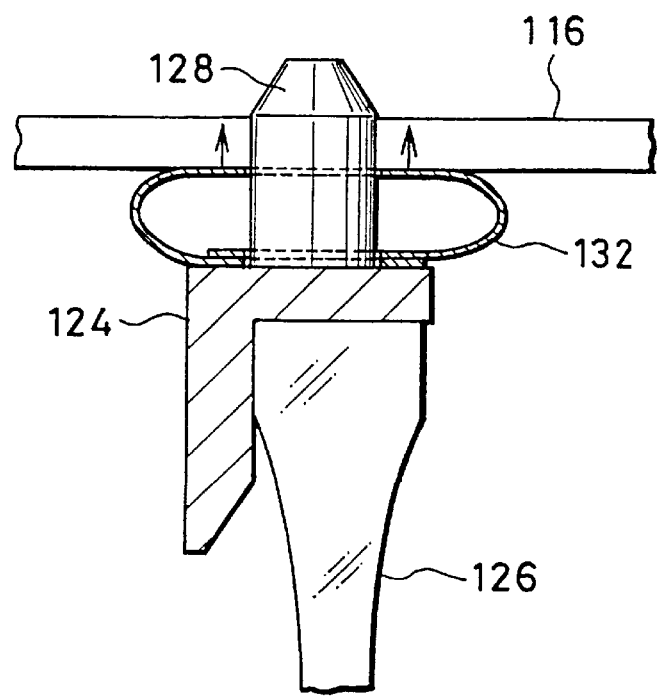
FIG. 15 is an explanatory diagram illustrating the operation of the resilient device.

FIG. 13 shows an embodiment where a polyester film 132 is mounted to a respective cam follower pin 128 of a rear lens frame 124. As shown in FIG. 14, the polyester film 132 is bent into a ring, and has holes 132a formed therethrough so the ring of polyester film 132 is fitted on the cam follower pin 128. Thereby, the polyester film rings 132 as resilient devices are placed in between the rear lens frame 124 and an axial movement barrel 116, as shown detail in FIG. 15. Because the polyester film rings 132 apply a resistance or friction against the movement of the rear lens frame 124 relative to the axial movement barrel 16, the cam follower pins 128 lean on one side walls of cam grooves 114b of a helical movement cam barrel 114 in the same way as shown in FIG. 12. Accordingly, the embodiment of FIG. 13 provide the same effect as the embodiment of FIG. 10.

It is possible to provide a resilient device like the synthetic fiber strip 130 or the polyester film ring 132 on each cam follower pin of a front lens frame in case where the front lens frame is moved through a cam mechanism.

Although the present invention has been described with respect to a zoom lens device, the present invention is applicable to a compact camera, a video camera and any other types of cameras.

Thus the present invention should not be limited to the above embodiments but, on the contrary, various modifications of the present invention may be possible to those skilled in the art without departing from the scope of claims attached hereto.

What is claimed is:

1. A lens device comprising a lens barrel, an internal member that is mounted inside the lens barrel and rotatable about an optical axis of the zoom lens device relative to the lens barrel but immovable in a direction of the optical axis relative to the lens barrel, and a front cover member secured to a front end of the lens barrel, the front cover member having an opening for exposing a center portion of the internal member, wherein a front face of the internal member and a rear surface of the front cover member are engaged with each other through a labyrinthine engagement and a clearance is provided in between the internal member and the front cover member for allowing the internal member to rotate relative to the front cover member;

wherein one of the front face of the internal member and the rear surface of the front cover member comprises a circular groove; and another of the front face of the internal member and the rear surface of the front cover member comprises a circular ridge, the circular ridge being fitted in the circular groove with the clearance.

2. A lens device as claimed in claim 1, wherein the internal member is a front lens frame holding a lens in the center portion thereof.

* * * * *